United States Patent [19]

DiMartino

[11] Patent Number: 4,857,083
[45] Date of Patent: Aug. 15, 1989

[54] VACUUM SWING ADSORPTION PROCESS WITH VACUUM AIDED INTERNAL RINSE

[75] Inventor: Stephen P. DiMartino, Topton, Pa.

[73] Assignee: Air Products and Chemicals, Inc., Allentown, Pa.

[21] Appl. No.: 262,414

[22] Filed: Oct. 25, 1988

[51] Int. Cl.[4] .............................................. B01D 53/04
[52] U.S. Cl. .......................................... 55/26; 55/58; 55/74; 55/75
[58] Field of Search .................... 55/25, 26, 58, 62, 79, 55/75

[56] References Cited

U.S. PATENT DOCUMENTS

| | | | |
|---|---|---|---|
| Re. 31,014 | 8/1982 | Sircar | 55/26 |
| 4,077,779 | 3/1978 | Sircar et al. | 55/25 |
| 4,790,858 | 12/1988 | Sircar | 55/26 |

Primary Examiner—Charles Hart
Attorney, Agent, or Firm—Keith D. Gourley; James C. Simmons; William F. Marsh

[57] ABSTRACT

The present invention is a continuous vacuum swing adsorption process for the fractionation of a multi-component feed gas mixture containing methane as a primary component and predominantly $CO_2$ as a secondary component. Mulit-component feed gas is passed through a plurality of adsorption columns containing adsorbent beds which selectively retain the secondary components while the primary component is discharged from each column and collected as product. Carbon dioxide is desorbed from the adsorbent beds by a vacuum assisted internal rinse step wherein a pressurized first adsorption column is operatively connected to an evacuated second adsorption column causing $CO_2$ and other secondary components to be countercurrently swept out of the first column and into the second column. Vacuum assisted internal rinsing of adsorption columns effectively replaces pump-driven rinse steps resulting in a substantial reduction in process power requirements. Additionally, process vacuum requirements are significantly reduced because an evacuated adsorption column is used as a vacuum source for internally rinsing another adsorption column.

6 Claims, 2 Drawing Sheets

MANIFOLDS A, B, C, D, E, F
ADSORPTION COLUMNS 1, 2, 3, 4

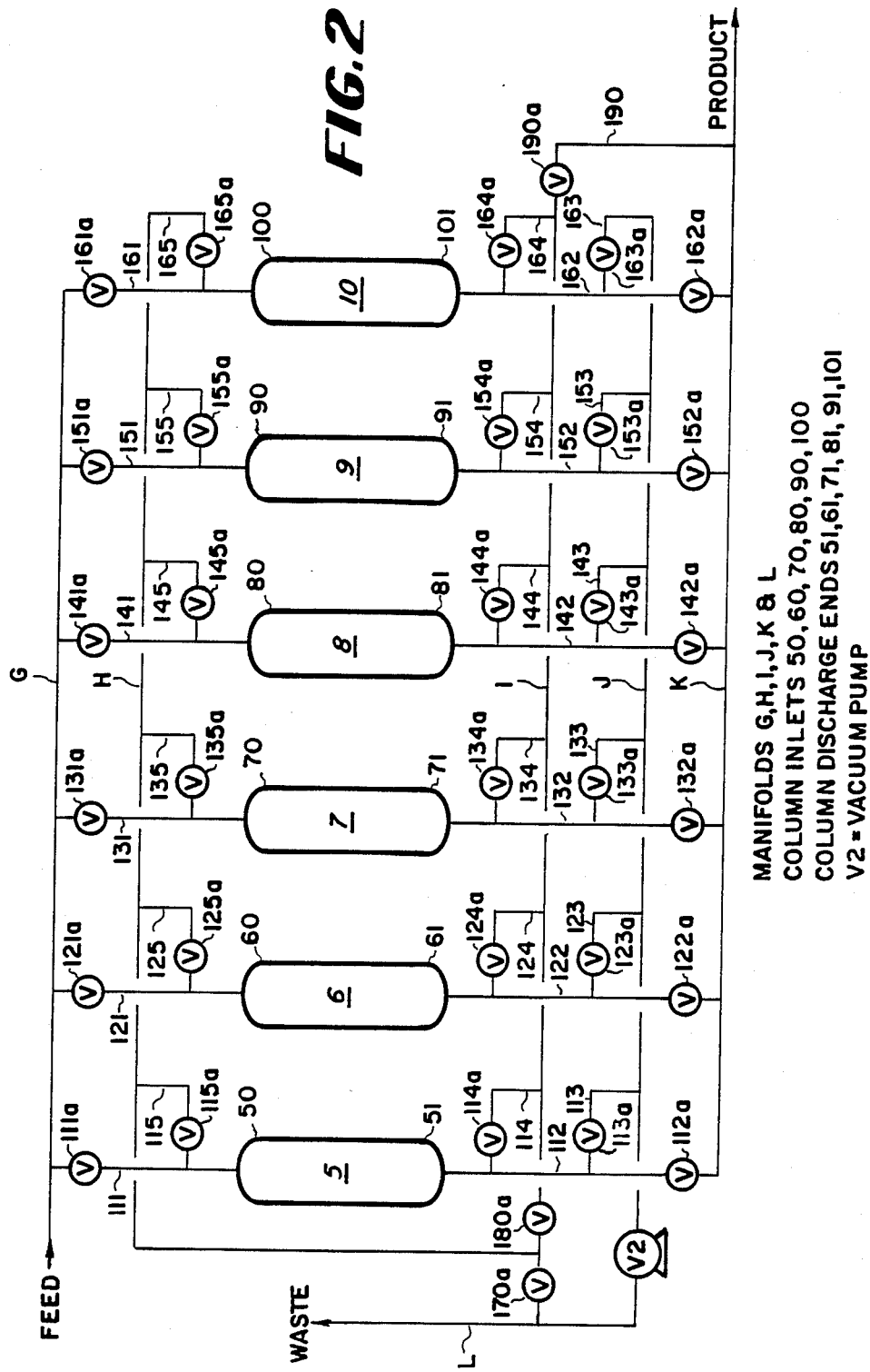

VACUUM SWING ADSORPTION PROCESS WITH VACUUM AIDED INTERNAL RINSE

TECHNICAL FIELD

The present invention relates generally to the separation and recovery of individual components of a gas mixture by pressure swing adsorption and is especially concerned with reducing the high energy requirements associated with recovery of a secondary component (e.g. carbon dioxide).

BACKGROUND OF THE INVENTION

The high cost of energy has led to the search for economical processes for recovering and purifying alternate fuel sources such as landfill gas, biogass and synthesis gas. However, the high energy costs associated with removing $CO_2$ from fuel sources such as methane, have hampered efforts to fully utilize alternate fuel sources and have restricted recovery efforts to larger fuel sources where economies of scale are more favorable.

Cyclic pressure swing adsorption systems are one of the technologies currently being employed to remove $CO_2$ from the above-mentioned fuel sources. These systems are designed to fractionate gaseous mixtures by selective adsorption wherein the gaseous mixture is passed through a plurality of adsorption columns containing adsorbent beds which selectively retain the secondary component, in this case $CO_2$, allowing for collection of the primary component, namely, the fuel source.

Representative of pressure swing adsorption processes is U.S. Pat. No. 4,077,779, issued to Air Products and Chemicals, Inc., wherein a gaseous mixture is separated into a primary gaseous product and a secondary gaseous product in a system comprising a plurality of adsorption zones operated in cycle in a predetermined timed sequence. Each adsorption zone contains a bed of solid sorbent preferentially selective toward the secondary gaseous product thereby allowing for separation and collection of the desired primary product. The method comprises the following sequence of operational steps performed in the order recited in each of the adsorption zones:

(a) passing the gaseous mixture to be separated through the bed of sorbent while discharging from the zone unsorbed gas as primary gaseous product, the adsorption zone having been previously brought to the desired superatmospheric feed gas pressure with primary gaseous product withdrawn from another adsorbent zone of the system;

(b) terminating the operation of step (a) as applied to the designated adsorbent zone and rinsing the zone in a direction concurrent to the initial feed with a stream of recompressed secondary gaseous product while discharging from the zone a gaseous rinse effluent which is recycled to another adsorbent zone then undergoing step (a) for admixture with gaseous feed mixture being admitted into that adsorption zone;

(c) lowering the pressure in the zone having undergone step (b) to an intermediate level to desorb residual gas and withdrawing such residual gas from the zone in a direction countercurrent to the feed gas flow, the withdrawn gas being recompressed for use, at least in part, to rinse an adsorption zone of the system undergoing step (b);

(d) purging the zone that has just undergone step (c) with air or an inert gas less strongly sorbed than the secondary gaseous component of the feed gas mixture;

(e) evacuating the purged zone to a sub-atmospheric pressure level to remove purge gas introduced in step (d); and (f) repressurizing the zone to about the feed pressure of step (a) by admitting a part of the primary product gas component withdrawn from an adsorption zone then undergoing step (a).

U.S. Pat. No. Re. 31,014 (originally issued as U.S. Pat. No. 4,171,206), discloses a nine-bed pressure swing cyclic adsorption system for separating a multi-component feed gas into a primary product and a secondary product wherein an adsorbent bed within the column selectively retains the secondary product. Following the adsorption step, the secondary product is desorbed from the adsorption bed by high pressure rinsing and pressure equalization steps. More particularly, pure secondary product is admitted countercurrently through the adsorption bed to rinse void gas and desorbed gas into a second bed. The rinsed first bed is then connected to another adsorption bed which has previously been evacuated to the lowest pressure in the cycle causing pressure to equalize within the two adsorption beds.

SUMMARY OF THE INVENTION

The present invention is an efficient vacuum swing adsorption process for removing $CO_2$ and gaseous hydrocarbons other than methane from less strongly adsorbable components of a multi-component feed gas mixture. The invention in its most basic embodiment contemplates at least two separate adsorption columns wherein the feed gas mixture is passed through a first adsorption column containing an adsorbent bed selective in retention of carbon dioxide and gaseous hydrocarbons other than methane. The unadsorbed gas discharged from the first column is collected as primary product while the adsorbed or secondary components are collected using a vacuum assisted internal rinse step.

The process of the invention involves the following sequence of steps:

1. ADSORPTION—The multi-component feed gas mixture at superatmospheric pressure (50-500 psig) is passed through a first adsorption column packed with an adsorption bed selective in retention of the secondary components of the feed gas mixture until the adsorbent is about saturated with multi-component feed gas. The primary component is discharged from the exit end of the adsorption column and collected as primary product or used in another step of the process. The secondary components are desorbed from the column is steps 2–6.

2. EQUALIZATION I—Upon terminating the adsorption step, $CO_2$ desorption is begun by placing the pressurized first column in concurrent flow communication with an evacuated second adsorption column. The pressure differential between the columns causes adsorbed secondary gas components in the first adsorption column to flow in a direction concurrent to the feed gas mixture into the second adsorption column thereby internally rinsing the first adsorption column with a stream of adsorbed gas. This step is continued until the pressure of the first and second adsorption columns is equalized.

3. BLOWDOWN TO ATMOSPHERIC PRESSURE—Following the equalization I step, the first adsorption column containing only $CO_2$ is vented or blown down to near atmospheric pressure causing additional $CO_2$ desorption.

4. EVACUATION—The first adsorption column now residing at about ambient pressure is evacuated in a direction concurrent to that of the initial feed causing yet further $CO_2$ desorption.

5. EQUALIZATION II—Following the evacuation step the first adsorption column is raised to an intermediate pressure level by admitting $CO_2$-rich gas then being discharged from the second adsorption column previously repressurized to superatmospheric pressure. The final equalized pressure of the first and second columns is about half of the feed pressure.

6. REPRESSURIZATION—The partially pressurized first adsorption column is again raised to superatmospheric pressure by introducing countercurrently a portion of the high purity primary methane product collected in step (1).

At least four adsorption columns are preferably employed for a continuous commercial process, the columns being operated in alternate timed sequence so that the charge of multi-component feed gas can be switched from one adsorption column to another in successive timed separation periods.

The present invention provides an improvement over the above-disclosed prior art processes by substantially reducing the energy requirements for removing secondary components, such as carbon dioxide, from a multi-component feed gas mixture by eliminating the external rinse step in favor of a novel sequence of steps.

BRIEF DESCRIPTION OF THE DRAWINGS

FIG. 2 is a process flow diagram illustrating another embodiment in which six adsorbent columns are employed.

DETAILED DESCRIPTION OF THE INVENTION

Figure 1:
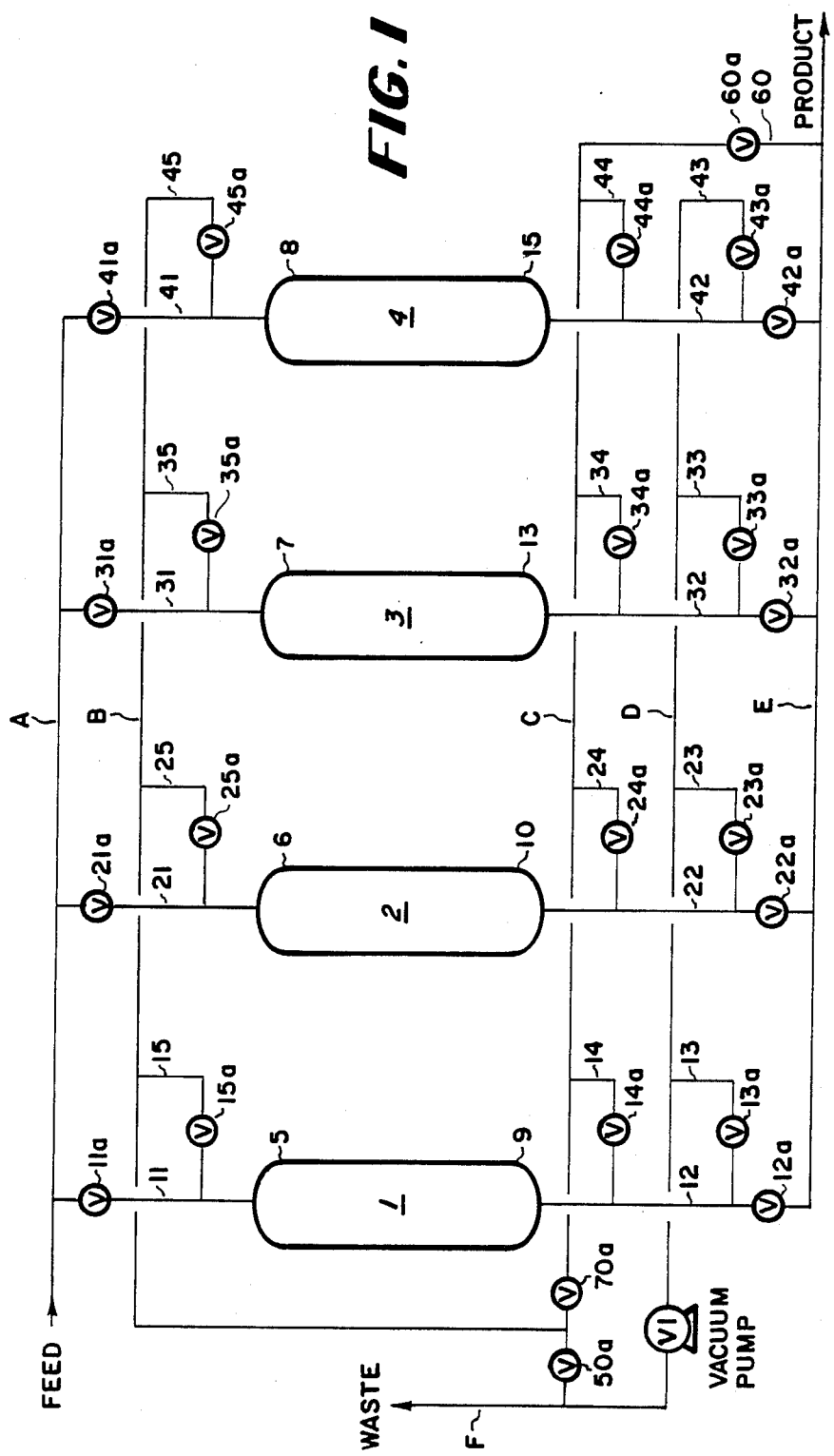
FIG. 1 is a process flow diagram of an embodiment utilizing four adsorption columns operated in a timed sequence cycle.

Referring now to FIG. 1 of the drawings, a bed of carbon dioxide selective adsorbent is contained in four parallel adsorption columns 1, 2, 3 and 4 which are operated alternatively in timed sequence. Multi-component feed gas to be fractioned is introduced into a selected one of the adsorption columns through manifold A from which branch inlet lines 11, 21, 31 and 41 connect to inlet ends 5, 6, 7 and 8 of individual adsorption columns 1, 2, 3 and 4, respectively. Each of the branch lines is equipped with a valve 11a, 21a, 31a and 41a, respectively. Opening of the appropriate valve permits flow of multi-component feed gas from manifold A into the selected adsorption column being initially placed on stream. Thus, by opening valve 11a, while valves 21a, 31a and 41a are closed, multi-component feed gas is caused to flow from manifold A through line 11 and into adsorption column 1.

Each of adsorption columns 1, 2, 3 and 4 is further provided at outlet ends 9, 10, 13 and 15, respectively, with an outlet gas line 12, 22, 32 and 42, each further equipped with exit control valves 12a, 22a, 32a and 42a, respectively. Conduits 12, 22, 32 and 42 are operatively connected to a gas discharge manifold E through which purified primary component product can be withdrawn. By opening the appropriate valve 12a, 22a, 32a or 42a, purified primary component gas will flow from the corresponding column through the connecting line and into discharge manifold E to be collected as product.

Each of columns 1, 2, 3 and 4 is further fitted with gas line 14, 24, 34 and 44, each being further provided with exit control valves 14a, 24a, 34a and 44a, respectively, such lines being in flow communication with manifold C. By opening the appropriate valve 14a, 24a, 34a and 44a discharge gas is allowed to exit the column though the connecting line in which the opened valve is located. Each column is placed in flow communication with discharge manifold C. Manifold C is equipped with exit control valves 50a, 70a and 60a which allow for operative connection with lines E and F for venting and discharge of columns 1, 2, 3 and 4.

Manifold B is operatively connected to manifolds C and F by exit control valves 50a and 70a. Branch inlet lines 11, 21, 31 and 41 connect to manifold B via lines 15, 25, 35 and 45, respectfully. Lines 15, 25, 35 and 45 are equipped with exit control valves 15a, 25a, 35a and 45a, which allow for communication between the discharge and feed ends of Columns 1, 2, 3 and 4.

Means for evacuating Columns 1, 2, 3 and 4 is provided by vacuum pump V1 which is operatively situated between manifolds D and F which in turn connect to a waste container (not shown). Manifold D is connected to branch lines 13, 23, 33, and 43. A vacuum can be drawn at discharge ends 9, 10, 13 and 15 of columns 1, 2, 3 and 4 by opening the appropriate controlling exit valve 13a, 23a, 33a or 43a, respectfully. For example, column 1 can be evacuated by opening exit valve 13a while closing exit valves 23a, 33a and 43a, thereby drawing a vacuum on lines 12, 13, and manifold D. The vacuum is vented to the atmosphere or to waste via manifold F.

Operation of the embodiment represented in FIG. 1 will now be explained in connection with an arbitrarily chosen cycle having eight timed separation periods of two minutes per period as set forth in Table 1. Although not limited thereto, the process as illustrated in FIG. 1 and Table 1, requires 4 adsorption columns for continuous operation of pumps and compressors. However, other arrangements using fewer adsorption columns may be employed if interrupted or discontinuous operation (using idling) of pumps or compressors is acceptable. Other arrangements may also be employed (e.g., employing more than four adsorption columns) by appropriate sequencing of the individual steps of the process cycle.

Each of the four respective adsorption columns undergoes two periods of the adsorption step, one period of the equalization I step, one period of the blowdown step, two periods of the evacuation step, one period of the equalization II step and one period of repressurization.

TABLE 1

| TIME (Min) | Column 1 | Column 2 | Column 3 | Column 4 |
| --- | --- | --- | --- | --- |
| 0-2 | Adsorption | Equalization II | Evacuation | Equalization I |
| 2-4 | Adsorption | Repressure | Evacuation | Blowdown |
| 4-6 | Equalization I | Adsorption | Equalization II | Evacuation |
| 6-8 | Blowdown | Adsorption | Repressure | Evacuation |
| 8-10 | Evacuation | Equalization I | Adsorption | Equalization II |

TABLE 1-continued

| TIME (Min) | Column 1 | Column 2 | Column 3 | Column 4 |
| --- | --- | --- | --- | --- |
| 10–12 | Evacuation | Blowdown | Adsorption | Repressure |
| 12–14 | Equalization II | Evacuation | Equalization I | Adsorption |
| 14–16 | Repressure | Evacuation | Blowdown | Adsorption |

TABLE 2

| Valve | 0–2 | 2–4 | 4–6 | 6–8 | 8–10 | 10–12 | 12–14 | 14–16 |
| --- | --- | --- | --- | --- | --- | --- | --- | --- |
| 11 | O | O | C | C | C | C | C | C |
| 12 | O | O | C | C | C | C | C | C |
| 13 | C | C | C | C | O | O | C | C |
| 14 | C | C | O | C | C | C | C | O |
| 15 | C | C | C | O | C | C | O | C |
| 21 | C | C | O | O | C | C | C | C |
| 22 | C | C | O | O | C | C | C | C |
| 23 | C | C | C | C | C | C | O | O |
| 24 | C | O | C | C | O | O | C | C |
| 25 | O | C | C | C | C | O | C | C |
| 31 | C | C | C | C | O | O | C | C |
| 32 | C | C | C | C | O | O | C | C |
| 33 | O | O | C | C | C | C | C | C |
| 34 | C | C | C | O | C | C | O | C |
| 35 | C | C | O | C | C | C | C | O |
| 41 | C | C | C | C | C | C | O | O |
| 42 | C | C | C | C | C | C | O | O |
| 43 | C | C | O | O | C | C | C | C |
| 44 | O | C | C | C | O | C | C | C |
| 45 | C | O | C | C | C | O | C | C |
| 50 | C | O | C | O | C | O | C | O |
| 60 | C | O | C | O | C | O | C | O |
| 70 | O | C | O | C | O | C | O | C |

As illustrated in Table 1, the steps undertaken at startup in each adsorption columns 1 through 4 are staggered to enable at least one of the four adsorption columns to undergo the adsorption step at all times during the process cycle. The practice of the invention involves principally the following sequence of steps:

(a) ADSORPTION—During the adsorption step feed gas is charged into manifold A and into an absorption column presently undergoing the adsorption step. Multi-component feed gas at superatmospheric pressure (50–500 psig) is passed through a first column having a bed packed with an adsorbent selective for retention of key secondary components of the feed gas. The adsorption step is continued until the adsorbent bed is about saturated with multi-component feed gas. The primary component is discharged from the exit end of the adsorption column and collected as product or used in another step of the process.

(b) PRESSURE EQUALIZATION I—Upon terminating the adsorption step, the first adsorption column maintained at superatmospheric pressure is operatively connected to a previously evacuated second adsorption column. The pressure differential between the columns causes adsorbed secondary components held in the first column, i.e., $CO_2$ and gaseous hydrocarbons, to desorb thereby rinsing adsorbent void space as the secondary components are drawn by internal vacuum through the first adsorbent column in a direction concurrent to that of the initial feed and into the previously evacuated second column. This equalization step causes the secondary components less strongly adsorbed than $CO_2$ to desorb thereby sweeping such components through the absorbent within the first adsorption column and into the second adsorption column. At the end of the equalization step, secondary components adsorbed in the first adsorption column are primarily limited to $CO_2$.

(c) BLOWDOWN TO ATMOSPHERIC PRESSURE—Following the equalization I step, the first adsorption column containing adsorbent loaded with $CO_2$ is reduced or blown down to atmospheric pressure which causes additional $CO_2$ desorption. More particularly, pressure is released in a direction countercurrent to the feed from the inlet end of the first adsorption column and is allowed to exit to waste or for use in another process.

(d) EVACUATION—The first column which is depressurized to near ambient pressure level in step (c) is then evacuated by vacuum pump VI, thereby reducing pressure within the adsorption column and desorbing further quantities of the secondary component in a direction concurrent to that of the initial feed. As previously noted, the embodiment disclosed in FIG. 1 contemplates two timed sequence periods of evacuation.

(e) PRESSURE EQUALIZATION II—Following evacuation step (d), the first adsorption column is raised to an intermediate pressure level by admitting adsorbed gas rich in secondary components discharged from a second adsorption column previously repressurized (step b) to superatmospheric pressure. Pressure from the second column is directed concurrent to the feed direction and preferably enters the feed end of the first adsorption column. The equalized pressure of the first and second columns is about half the feed pressure.

(f) REPRESSURIZATION—The first adsorption column is then brought to the superatmospheric pressure of step (a) by introducing high purity primary product collected from step (a) into the adsorption column in a direction countercurrent to feed.

The initial first column is now ready for repetition of the cycle beginning with step (a).

The valve positions during the above-mentioned operating cycle are set forth in Table 2. The designation O indicates that the valve is open while a blank represents a closed valve. It may be seen from FIG. 1 and Table 1 that adsorption is continuous to avoid discontinuities in product flow. Moreover, equalization is continuous to avoid idling the vacuum pump which wastes power.

The number of equalization steps (steps b and e) required in a given embodiment and the length of the timed sequence period thereof will be determined by various factors such as (i) feed pressure, (ii) feed composition, (iii) desorption characteristics, (iv) product purity, (v) product recovery and (vi) the total number of adsorption columns employed in the process. While only two equalization steps (Equalizations I and II) are depicted in FIG. 1, the invention also contemplates additional equalization steps to maximize use of total vacuum power.

The operative sequence of steps occurring in adsorption column 1 during a complete adsorption cycle will now be described in exhaustive detail so that operation of a continuous process will be fully understood. The identical sequence of steps according to Table 1 occurs in staggered sequence in adsorption columns 2, 3 and 4.

Again, referring to the embodiment disclosed in FIG. 1 and the timed sequences periods and valve positions designated in Tables 1 and 2, adsorption column 1 undergoes two timed sequence periods of the adsorption step. Multi-component feed gas is introduced into adsorption column 1 by opening valves 11a and 12a and closing valves 13a, 14a and 15a thereby allowing feed gas to flow through manifold A, line 11 and into adsorption column 1 which contains adsorbent selective toward retention of $CO_2$ and gaseous hydrocarbons other than methane. The unadsorbed $CO_2$-free methane primary component exits the discharge end 9 of column 1 via line 12 and flows into manifold E to be collected as product while the secondary components, primarily $CO_2$ and other gaseous hydrocarbons, are retained in the column by the selective adsorbent. In general, the adsorption step is preferably continued until or just short of break-through of the secondary component ($CO_2$ in the illustrated case) at the exit end 9 of adsorption column 1.

The remainder of the steps taken in timed sequence periods 3 through 8 involve desorption of the secondary components, namely $CO_2$ and to a lesser extent gaseous hydrocarbons other than methane, from the selective adsorbent within each column. It has been discovered that prior art processes for desorbing carbon dioxide from an adsorbent bed which involve the steps of rinsing the adsorbent with an external supply of carbon dioxide followed by evacuation of the adsorption column at superatmospheric pressure can be economically replaced by a vacuum assisted internal rinse step accomplished in the following steps.

Desorption of $CO_2$ from adsorbent is begun wherein a first and second adsorption columns undergo an equalization I step. The discharge end 9 of adsorption column 1 is placed in flow communication with the inlet end 7 of adsorption column 3 which has just finished a period of evacuation. The pressure differential between adsorption columns 1 and 3 causes desorption of adsorbed secondary gas components in the first column, particularly adsorbed gaseous hydrocarbons, to flow concurrently through and out of column 1 and into adsorption column 3 thereby internally rinsing the void space of absorbent column 1 with a stream of adsorbed gas. Equalization pressure is provided by adsorption column 1 by opening valves 14a, 70a and 35a which allows pressure to be released though line 14, manifold B and line 35 which empties into the feed end of column 3.

Adsorption column 1 which resides at an intermediate pressure following the equalization step, is blown down or vented to near atmospheric pressure by open valves 15a and 50a thereby causing pressure above ambient to exit to waste or into a collection container (not shown) via lines 15, manifold B and manifold F.

Column 1 then undergoes evacuation which causes further desorption of secondary components in a direction concurrent to that of the initial feed. Valve 13 is opened and vacuum pump VI creates a negative pressure at the discharge end 9 of adsorption column 1 thereby causing the remaining secondary components adsorbed and void gas within the adsorbent bed to be swept through the adsorption column in a direction concurrent to the feed. The secondary components and void gas pass through lines 12, 13 and manifold F to be collected as waste or directed toward another process.

The pressure in adsorption column 1 is equalized to a pressure intermediate to that of the feed in the seventh timed sequence period. Column 3 which has just undergone an adsorption period is placed in flow communication with adsorption column 1 thereby pressurizing adsorption column 1 to an intermediate pressure level. More particularly, valves 34a, 70a and 15a are opened causing pressurized secondary components and void gas to exit the discharge end 13 of adsorption column 3 in a direction concurrent to the feed and to flow through lines 32, 34, manifold C, manifold B, line 15 and line 11 until entering the inlet end 5 of column 1. During the equalization II step, valves 50a and 60a are closed.

In the eighth and final timed sequence period of the cycle, adsorption column 1 is raised from an intermediate pressure to superatmospheric pressure in anticipation of beginning another cycle. Valves 60a and 14a are opened and high purity primary product is introduced into discharge end 9 of adsorption column 1 in a direction countercurrent to the feed via lines 60, manifold C and line 14. This period continues until adsorption column 1 is sufficiently pressurized to accept pressurized multi-component feed gas in the first timed sequence period of the next cycle.

The process proceeds in the above-mentioned steps according to Table 1. While the two timed sequence periods of adsorption are depicted as being of equal length, this is neither required or necessary. The times will be set by allowable maximum gas flow rates and economic valve and line sizes.

The pressure to be employed during the adsorption step in a system having more than four adsorbent beds will depend largely on the pressure of the available gas mixture to be purified. Preferably, the feed pressure should be at least 50 psig. The length of time to be assigned to the adsorption step should be chosen with reference to the capacity of the adsorbent bed in the column.

The preferred adsorbent for selective adsorption of $CO_2$ and light gaseous hydrocarbons other than methane from admixture containing hydrogen or separation of $CO_2$ from methane, is activated carbon. Other solid adsorbents suitable for practicing this invention include molecular sieve zeolites such as 5A, molecular sieve carbons, silica gel, activated alumina, or mixtures of these or other adsorbents capable of selectively retaining $CO_2$ and/or low molecular weight hydrocarbons other than methane while passing methane and hydrogen at the operating conditions.

Again, referring to FIG. 1, valves 50a, 60a and 70a should be modulating valves equipped with a positioner allowing them to ramp open slowly to maintain constant flow with varying pressure differentials. The other valves, 11a–15a, 21a–25a, 31a–35a and 41a–45a should be switch valves equipped with actuators.

Among alternative arrangements that may be used are cycles having 4, 5 or 6 adsorption columns and having more than two pressure equalization steps. Two equalization steps are more efficient than one as a lower pressure can be obtained in depressurizing the bed thereby reducing total vacuum pump demands. As previously stated, the particular arrangement of steps to be used depends upon the multi-component feed gas pressure and the amount of secondary components contained therein as well as the degree of purity desired in the primary and secondary components.

This invention contemplates cycles wherein 1, 2 or 3 adsorption beds on-line at any one time. Having more beds on-line simultaneously reduces overall system costs as each bed may be downsized in view of the reduced flow through each respective adsorption column. For example, the total adsorbent volume required to run a five adsorbent bed system having two adsorption columns on-line continuously is 37.5% less than the quantity required for a four bed process having only one adsorption bed on-line during a complete cycle. Further savings are achieved by the resultant reduction in vessel diameter and piping and valve sizes. This reduction will usually offset costs associated with the larger number of components required to run a system having more than adsorption beds.

In the alternate embodiment shown in FIG. 2, six adsorption columns labelled 5-10, inclusive are employed. This embodiment is designed so that three columns simultaneously undergo the adsorption subcycle thereby increasing process capacity while allowing for reduction in vessel diameter and piping sizes.

Referring now to FIG. 2, multi-component feed gas to be fractioned is introduced into a selected adsorption column through manifold G from which branch inlet lines 111, 121, 131, 141, 151 and 161 connect to adsorption columns 5, 6, 7, 8, 9 and 10, via inlet ends 50, 60, 70, 80, 90 and 100. Each of the branch lines is equipped with a valve 111a, 121a, 131a, 141a, 151a and 161a, respectively, which permits flow of multi-component feed gas from manifold G into the selected adsorption columns being initially placed on stream.

Each of adsorption columns 5, 6, 7, 8, 9 and 10 is equipped at its discharge end 51, 61, 71, 81, 91 and 101, with gas lines 112, 122, 132, 142, 152 and 162, respectively, each being further equipped with exit control valves 112a, 122a, 132a, 142a, 152a and 162a, respectively. Lines 112, 122, 132, 142, 152 and 162 are operatively connected to gas discharge manifold K through which purified primary component product can be withdrawn. By opening the appropriate valve 112a, 122a, 132a, 142a 152a or 162a, purified primary component gas is caused to flow from the corresponding adsorption column through the connecting line and into discharge manifold K to be collected as product.

Manifold I is operatively connected to lines 112, 122, 132, 142, 152 and 162 by lines 114, 124, 134, 144, 154 and 164, each line being further equipped with valves 114a, 124a, 134a, 144a, 154a and 164a. Manifold I is equipped with exit control valves 170a, 180a and 190a which allow for operative connection to manifolds K and L for venting and discharge of columns 5 through 10.

Means for evacuating Columns 5 through 10 is provided by vacuum pump V2 which is operatively connected to manifolds L and J wherein manifold L is further connected to a waste container (not shown). Manifold J is connected to branch lines 112, 122, 132, 142, 152 and 162 via lines 113, 123, 133, 143, 153 and 163. A vacuum can be drawn at the discharge end of columns 5 through 10 by opening the appropriate exit control valves 113a, 123a, 133a and 143a, 153a and 163a, respectfully. For example, column 5 can be evacuated by opening exit valve 113a while closing exit valves 123a, 133a and 143a, 153a and 163a thereby drawing a vacuum in manifold J and lines 112 and 113. The vacuum is then vented to the atmosphere or to waste via manifold L.

Operation of the embodiment represented in FIG. 2 is explained in connection with an arbitrarily chosen cycle having twelve timed separation periods of two minutes per period. The sequence of steps occurring within each respective column is disclosed in Table 3. Table 4 discloses the valve positions during each step of the process cycle. Each of the six respective adsorption columns undergoes six periods of adsorption, one period of the equalization I step, one period of the blowdown step, two periods of the evacuation step, one period of the equalization II step and one period of repressurization. Each absorption column undergoes the sequence of steps hereinafter described under control of a cycle timer.

Adsorption column 5 undergoes six timed sequence periods of the adsorption step. Multi-component feed gas is introduced into inlet end 50 of adsorption column 5 by opening valves 111a and 112a thereby allowing feed gas to flow through manifold G, line 111 and into adsorption column 5 which contains adsorbent selective toward retention of $CO_2$ and gaseous hydrocarbons other than methane. Unadsorbed $CO_2$-free methane primary component exits discharge end 51 of adsorption column 5 via line 112 and flows into manifold K to be collected as product while the secondary components are retained by the selective adsorbent within adsorption column 5.

Next, adsorption columns 5 and 9 undergo an equalization I step wherein the discharge end 51 of adsorption column 5 is placed in flow communication with the inlet end 90 of adsorption column 9 which has just finished a period of evacuation.

TABLE 3

| TIME (Min) | Column 5 | Column 6 | Column 7 | Column 8 | Column 9 | Column 10 |
|---|---|---|---|---|---|---|
| 0-2 | Adsorption | Equalization II | Evacuation | Equalization I | Adsorption | Adsorption |
| 2-4 | Adsorption | Repressure | Evacuation | Blowdown | Adsorption | Adsorption |
| 4-6 | Adsorption | Adsorption | Equalization II | Evacuation | Equalization I | Adsorption |
| 6-8 | Adsorption | Adsorption | Repressure | Evacuation | Blowdown | Adsorption |
| 8-10 | Adsorption | Adsorption | Adsorption | Equalization II | Evacuation | Equalization |
| 10-12 | Adsorption | Adsorption | Adsorption | Repressure | Evacuation | Blowdown |
| 12-14 | Equalization I | Adsorption | Adsorption | Adsorption | Equalization II | Evacuation |
| 14-16 | Blowdown | Adsorption | Adsorption | Adsorption | Repressure | Evacuation |
| 16-18 | Evacuation | Equalization I | Adsorption | Adsorption | Adsorption | Equalization |
| 18-20 | Evacuation | Blowdown | Adsorption | Adsorption | Adsorption | Repressure |
| 20-22 | Equalization II | Evacuation | Equalization I | Adsorption | Adsorption | Adsorption |
| 22-24 | Repressure | Evacuation | Blowdown | Adsorption | Adsorption | Adsorption |

TABLE 4

| Valve | 0-2 | 2-4 | 4-6 | 6-8 | 8-10 | 10-12 | 12-14 | 14-16 | 16-18 | 18-20 | 20-22 | 22-24 |
|---|---|---|---|---|---|---|---|---|---|---|---|---|
| 11 | O | O | O | O | O | O | C | C | C | C | C | C |
| 12 | O | O | O | O | O | O | C | C | C | C | C | C |
| 13 | C | C | C | C | C | C | C | C | O | C | C | C |
| 14 | C | C | C | C | C | C | O | C | C | C | C | C |
| 15 | C | C | C | C | C | C | C | O | C | C | O | O |
| 21 | C | C | O | O | O | O | O | O | C | C | C | C |

TABLE 4-continued

| Valve | 0-2 | 2-4 | 4-6 | 6-8 | 8-10 | 10-12 | 12-14 | 14-16 | 16-18 | 18-20 | 20-22 | 22-24 |
|---|---|---|---|---|---|---|---|---|---|---|---|---|
| 22 | C | C | O | O | O | O | O | O | C | C | C | C |
| 23 | C | C | C | C | C | C | C | C | C | C | O | O |
| 24 | C | O | C | C | C | C | C | C | C | O | C | C |
| 25 | O | C | C | C | C | C | C | C | C | O | C | C |
| 31 | C | C | C | C | O | O | O | O | O | O | C | C |
| 32 | O | C | C | C | O | O | O | O | O | O | C | C |
| 33 | O | O | C | C | C | C | C | C | C | C | C | C |
| 34 | C | C | C | O | C | C | C | C | C | C | O | C |
| 35 | C | C | O | C | C | C | C | C | C | C | C | O |
| 41 | C | C | C | C | C | C | O | O | O | O | O | O |
| 42 | C | C | C | C | C | C | O | O | O | O | O | O |
| 43 | C | C | O | O | C | C | C | C | C | C | C | C |
| 44 | O | C | C | C | C | O | C | C | C | C | C | C |
| 45 | C | O | C | C | O | C | C | C | C | C | C | C |
| 51 | O | O | C | C | C | C | C | C | O | O | O | O |
| 52 | O | O | C | C | C | C | C | C | O | O | O | O |
| 53 | C | C | C | C | O | O | C | C | C | O | C | C |
| 54 | C | C | O | C | C | C | C | O | C | O | C | O |
| 55 | C | C | C | O | C | C | O | C | C | C | C | O |
| 61 | O | O | O | O | C | C | C | C | C | C | O | O |
| 62 | O | O | O | O | C | C | C | C | C | C | O | O |
| 63 | C | C | C | C | C | C | O | O | C | C | C | C |
| 64 | C | C | C | C | O | C | C | C | C | O | C | C |
| 65 | C | C | C | C | C | O | C | C | O | C | C | C |
| 70 | C | O | C | O | C | O | C | O | C | O | C | O |
| 80 | O | C | O | C | O | C | O | C | O | C | O | C |
| 90 | C | O | C | O | C | O | C | O | C | O | C | O |

The pressure differential between adsorption columns 5 and 9 causes desorption of adsorbed secondary gas components in column 5, particularly adsorbed gaseous hydrocarbons, to flow through and out of column 5 in a direction concurrent to feed and into inlet 90 of adsorption column 9 thereby internally rinsing the void space of absorbent column 5 with a stream of adsorbed gas. Equalization pressure is provided by opening valves 114a, 180a and 155a thereby allowing pressure within adsorption column 5 to be released though line 114, manifold I, manifold H and line 155 which empties into the inlet end 90 of column 9.

Adsorption column 5 residing at an intermediate pressure following the equalization I step is blown down or vented to near atmospheric pressure by open valves 115a and 170a thereby causing pressure above ambient to exit to waste or into a collection container (not shown) via lines 115, manifold H, manifold I and manifold L.

Next, Column 5 undergoes evacuation which causes further desorption of secondary components in a direction concurrent to that of the initial feed. Valve 113a is opened and vacuum pump V2 creates a negative pressure at the discharge end 51 of adsorption column 5 thereby causing void gas and the remaining secondary components adsorbed within the adsorbent bed to be swept through the adsorption column in a direction concurrent to the feed. The secondary components and void gas pass through lines 112, 113, manifold J and manifold L to be collected as waste or channeled to another process.

The pressure in adsorption column 5 is again equalized to a pressure intermediate to that of the feed. Column 7 which has just undergone an adsorption period is placed in flow communication with the inlet end 50 of adsorption column 5 thereby pressurizing adsorption column 5 to an intermediate pressure level. More particularly, valves 134a, 180a and 115a are opened causing pressurized secondary components and void gas to exit adsorption column 7 in a direction concurrent to the feed and to flow through lines 132 and 134, manifold I, manifold H and line 115 until entering the inlet end 50 of column 5.

In the twelfth and final timed sequence period of the cycle, adsorption column 5 is raised from an intermediate pressure to superatmospheric pressure in anticipation of beginning another cycle. Valves 190a and 114a are opened and high purity primary product is introduced into the discharge end 51 of adsorption column 5 in a direction countercurrent to the feed via lines 190, manifold I, line 114 and line 112. This period continues until adsorption column 5 is sufficiently pressurized to accept pressurized multi-component feed gas in the first timed sequence period of the next cycle.

Numerous additional embodiments are contemplated which use the sequence of steps disclosed in FIGS. 1 and 2. For example, those skilled in the art can easily construct an embodiment having five adsorption beds wherein more than two equalization steps are employed. Moreover, while the embodiments disclosed herein have been described with reference to $CO_2$-methane separation, the process is applicable to feed mixtures containing trace amounts of other contaminants such as water. The process can also be readily adapted for use in the separation of multi-component gas mixtures containing a primary component other than methane.

The key benefits to be achieved by operation according to this invention are:

1. High purity of the primary product stream (e.g., methane) and the secondary product stream (e.g. $CO_2$);
2. Reduced power requirements in the evacuation steps due to the partial evacuation achieved by the equalization steps I and II;
3. The equalization steps provide a means for rinsing the adsorption column without the expensive use of a pump as required in prior art processes; and
4. Continuous operation of vacuum pumps.

Having thus described the present invention, what is now deemed appropriate for Letters Patent is set out in the following appended claims.

What is claimed is:

1. The method of separating the components of a gaseous mixture into a primary gaseous product and a secondary gaseous product in a system comprising a plurality of adsorption columns operated in cycle in a predetermined timed sequence, each adsorption column containing a bed of solid adsorbent preferentially selective for retention of said secondary gaseous product, which method comprises the following sequence of operational steps performed in the order recited in each of said adsorption zones in its turn:

(a) introducing the gaseous mixture to be separated into a first adsorption column and passing the gaseous mixture through the bed of adsorbent in said first column while discharging from said first column unadsorbed gas as primary gaseous product, said first adsorption column having been previously brought to superatmospheric feed gas pressure in step (f) with primary gaseous product withdrawn from another adsorbent column of said system;

(b) terminating operation of step (a) as applied to the first adsorption column and reducing the pressure in the first adsorption column to an intermediate pressure level by connecting the discharge end of the first column to the inlet end of a second adsorption column which has been previously evacuated thereby causing the residual gas in the first adsorption column to flow into the second adsorption column;

(c) further depressurizing the first adsorption column by venting to near ambient pressure;

(d) evacuating said first adsorption column to subatmospheric level;

(e) equalizing the pressure within the first and second adsorption columns by introducing into the first column primary gaseous product from the second adsorption column already pressurized to the desired superatmospheric gas pressure thereby equalizing said first and second adsorption columns to said intermediate pressure level;

(f) repressurizing the first adsorption column to an intermediate pressure level relative to the feed gas pressure by admitting the discharge gas of the second column which is rich in secondary components, said second adsorption column having been previously repressurized to superatmospheric pressure; and (g) repressurizing said first adsorption column to said superatmospheric feed pressure with primary gas product.

2. The method as defined in claim 1 wherein said gaseous mixture to be separated comprises methane in admixture with carbon dioxide.

3. The method as defined in claim 2 wherein the adsorbent is selected from the group consisting of activated carbon, silica gel, activated alumina, molecular sieve zeolites and molecular sieve carbons.

4. The method as defined in claim 2 wherein the adsorbent is activated carbon.

5. The method as defined in claim 2 wherein said gaseous mixture to be separated comprises hydrogen in admixture with at least one gas from the group consisting of $CO_2$ and $C_2$–$C_4$ alkanes.

6. The method as defined in claim 2 wherein the system comprises 4, 5 or six adsorption columns.

* * * * *